United States Patent [19]

Bozzo

[11] 4,097,980

[45] Jul. 4, 1978

[54] METHOD OF MANUFACTURE OF A MECHANICAL CORK PULLER

[75] Inventor: George J. Bozzo, New Milford, N.J.

[73] Assignee: Irvinware Division of Beatrice Foods Company, Astoria, N.Y.

[21] Appl. No.: 773,169

[22] Filed: Mar. 1, 1977

Related U.S. Application Data

[62] Division of Ser. No. 647,784, Jan. 9, 1976.

[51] Int. Cl.[2] .............................................. B23P 19/00

[52] U.S. Cl. ........................................ 29/434; 29/453; 403/159

[58] Field of Search ................. 29/434, 453, 416, 418; 81/3 A, 3.37; 74/422, 524, 534, 535, 536; 403/157, 159; 254/12, 95

[56] References Cited

U.S. PATENT DOCUMENTS

| | | | |
|---|---|---|---|
| 1,753,026 | 4/1930 | Rosati | 81/3.37 |
| 2,305,562 | 12/1942 | Thompson et al. | 403/159 |
| 2,675,606 | 4/1954 | Lawson | 29/453 X |

*Primary Examiner*—Charlie T. Moon

*Attorney, Agent, or Firm*—Morgan, Finnegan, Pine, Foley & Lee

[57] ABSTRACT

An improved mechanical cork puller wherein the pivot holes of the lever arms receive and pivot about one or more ribs formed on the inner surfaces of the opposed pairs of support ears, resulting in no visible sign of a pivot support on the outer surfaces of the support ears. The support ears have an inwardly diverging taper providing free meshing movement between the toothed sectors of the lever arms and the cork puller shaft. To manufacture, elongated rib members are initially die-cast on the inner surfaces of the support ears and thereafter cut away to the desired length to form the pivot support for the lever arms. As cast, the inner surfaces of the support ears diverge outwardly and thereafter the outer ends of the support ears are bent toward each other so that the inner surfaces thereof diverge inwardly. The lever arms are thereafter assembled by merely forcing fitting them into place between the support ears.

7 Claims, 8 Drawing Figures

METHOD OF MANUFACTURE OF A MECHANICAL CORK PULLER

This is a division of application Ser. No. 647,784 filed Jan. 9, 1976.

BACKGROUND AND OBJECTS OF THE INVENTION

1. Field of the Invention

The present invention relates generally to mechanical cork pullers of the type wherein the puller shaft is in meshed relationship with a pair of toothed sectors formed on rotatably mounted lever arms which serve to drive the puller shaft upwardly to raise and remove a cork, and relates more particularly to certain new and useful improvements in the construction of such mechanical cork pullers and in their method of manufacture.

2. Description of the Prior Art

All mechanical cork pullers of the aforementioned type heretofore known have been constructed with either a pin, rivet, screw or eyelet extending between opposed pairs of support ears, about which the lever arms rotate upon operation of the device.

A representative example of the previous constructions of these mechanical cork puller devices is illustrated in FIG. 1 of the accompanying drawings, which is more fully described hereinafter.

The aforesaid known prior constructions of the mechanical cork pullers are disadvantageous for several reasons. Firstly, as illustrated in FIG. 1 of the accompanying drawings, the use of a pin, rivet, etc., for the mounting of the lever arms requires that the holes be drilled through the support ears and results in the appearance of unsightly circles or rivet or screw heads on the outer surfaces of the ears at the pivot points for the rotatable lever arms.

Secondly, the prior known constructions of mechanical cork pullers tend to develop locking, jamming or sticking problems. This is believed due to imprecise location and/or direction of the holes drilled through the support ears, or due to imprecise manufacture or insertion of the pins, rivets or eyelets, or, in the case of screws, excessive tightening of the screws, causing the support ears to inhibit freedom of movement of the lever arms.

In addition, manufacture and assembly of these prior known constructions is complicated because it requires (1) a precision drilling operation for the support ears, (2) a special tool and (3) a separate step for insertion of the pin, rivet, etc. through the ear holes, and (4) the separate manufacture or purchase of the pins, rivets, etc.

OBJECTS OF THE INVENTION

It is therefore an object of this invention to provide, as an article of manufacture, a novel and improved mechanical cork puller.

Another object of this invention is to provide a novel and improved method of manufacture of a mechanical cork puller.

Another object of this invention is to provide a novel and improved mechanical cork puller and method of manufacture thereof which fully eliminate the disadvantages of known constructions for such devices and their method of manufacture.

Another object of this invention is to provide a novel and improved mechanical cork puller in which the outer surfaces of the support ears having lever arms pivotally mounted therebetween are unusually smooth and attractive.

Another object of this invention is to provide a novel and improved method of manufacture of mechanical cork pullers that is simple to perform and yet which provides a mechanical cork puller device that is exceptionally durable and free of any operative difficulties.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, steps, processes and improvements herein shown and described.

SUMMARY OF THE INVENTION

Briefly described, the mechanical cork puller of the present invention is characterized by the pivot means for the rotatable lever arms, which comprises one or more, preferably two, raised rib members formed on the inner surfaces of each opposed pair of support ears about which the lever arms pivot. Preferably, the inner surfaces of each pair of support ears have an inwardly diverging taper, with the outer ends fitting closely against the sides of the toothed sectors of the lever arms, while a loose fit is maintained adjacent the point of meshed engagement between the toothed sectors and the circumferential grooves on the cork puller shaft.

The method of manufacture of the mechanical cork puller of the present invention comprises, in the preferred embodiment, die casting a pair of spaced parallel rib members on the inner surfaces of the support ears along the entire length thereof from the tubular housing for the cork puller shaft to the desired outermost point. Also, the support ears are cast so that the inner surfaces of each opposed pair have an outwardly diverging taper. Thereafter, the inner portions of the rib members are shaved off to form a pair of ribs adapted to closely fit within the pivot hole of a lever arm and the outer ends of the support ears are bent toward each other to an intermediate position where their inner surfaces are approximately parallel. The lever arms are then forceably slidably inserted between each pair of opposed ears, thereby springing the ears apart, until the rib members are received by the pivot holes, whereupon the ears snap back to their aforesaid intermediate position where they fit loosely on either side of the lever arm. The outer ends of the support ears are then further bent toward each other to their final assembled position, where they fit closely against the sides of the lever arms, while retaining a loose fit at the ends thereof adjacent the tubular housing for the cork puller shaft.

In an alternate embodiment of the method of the invention, the outer ends of the opposed pairs of support ears are bent toward each other from the originally cast position to the final assembled position in a single bending step, and the lever arms are thereafter forceably slidably inserted therebetween.

It will be apparent from the foregoing general description that the objects of the invention specifically enumerated herein are accomplished by the invention as here embodied.

Thus, by mounting the lever arms for pivotal movement about rib members formed only on the inner surfaces of the support ears, the unsightly appearance of circles or rivet or screw heads is eliminated. Indeed, there is no visible sign at all of the pivot point on the outer surfaces of the support ears. These surfaces are completely smooth and are therefore unusually attractive.

The rib members forming the lever arm pivot support, in combination with an inwardly diverging taper between the respective opposed inner surfaces of the support ears, cooperate to provide free pivotal movement of the lever arm while maintaining positive meshing engagement thereof with the cork puller shaft. There is remarkable freedom from any of the tendencies to lock, jam or stick as are associated with the use of a pin, rivet, screw or eyelet in the prior constructions, and yet the lever arms are held in place about the rib members by a very strong retaining force.

Moreover, in addition to the foregoing improvements in the article, the method of manufacture of the invention is greatly simplified and less expensive to perform then previously known methods. Thus, there is no drilling operation for the support ears, no separate manufacture of the pin, rivet, screw or eyelet, and no special tool or step for inserting same through the ear holes. In addition, the simultaneous snap-in and locking assembly of the lever arms between the support ears is much more quickly and easily accomplished than the prior art assembly techniques.

In sum, the mechanical cork puller of the invention is exceedingly simple to construct and assemble, and yet surprisingly effective in durability and operation, and is unusually attractive in appearance.

It will be understood that the foregoing general description and the following detailed description as well are exemplary and explanatory of the invention but are not restrictive thereof.

The accompanying drawings, referred to herein and constituting a part hereof, illustrate a representative prior art construction for a mechanical cork puller, and also preferred embodiments of the article and method of manufacture of the present invention, and together with the description, serve to explain the principles of the invention.

DESCRIPTION OF THE PREFERRED EMBODIMENTS

Figure 1:
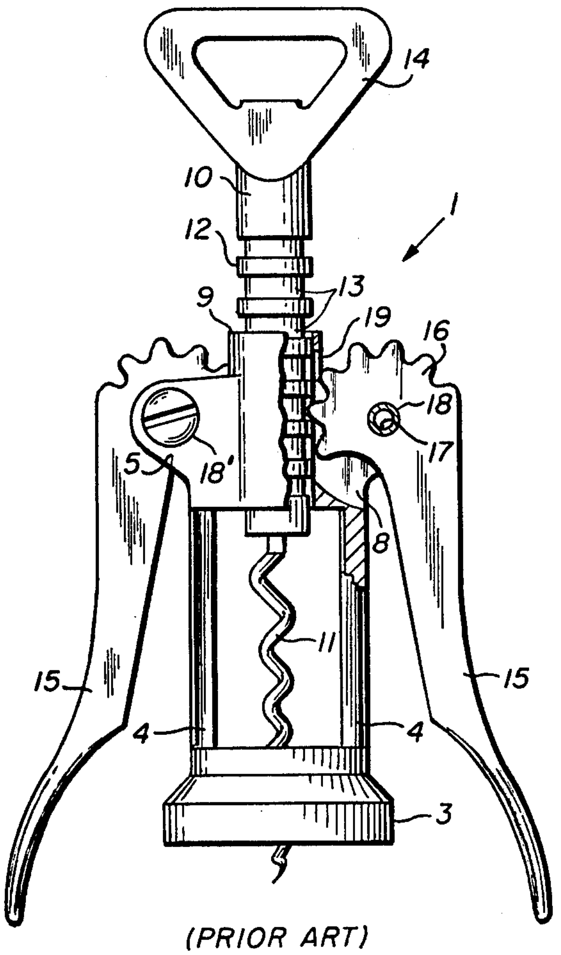
(PRIOR ART) FIG. 1
FIG. 1 is a view in elevation, partly sectional, of a mechanical cork puller constructed according to the prior art, illustrating, in section, the lever arm mounted for pivotal movement about a pin or eyelet, and, in elevation, the lever arm mounted for pivotal movement about a screw, extending between a pair of opposed support ears.

Referring initially to FIG. 1 of the accompanying drawings, there is illustrated a representative construction of known prior art mechanical cork pullers, indicated generally by reference numeral 1.

These devices typically include a main body portion 2 having a circular open-ended base 3 adapted to rest upon the top rim of a corked bottle neck (not shown) from which strut members 4 extend upwardly, connecting at their upper ends to opposed pairs of spaced support ears 5, 6 (not shown) and 7 (not shown), 8, respectively (only one ear of each pair being shown), located on either side of a tubular housing 9 telescopically slidably receiving a cork puller shaft 10 therein. The cork puller shaft 10 includes a worm portion 11 to be embedded in the cork, a screw portion 12 comprising a plurality of parallel grooves 13 extending circumferentially about the shaft and, advantageously, a closed winged upper end 14 facilitating manual turning of the shaft and serving the dual purpose of a bottle cap opener. A lever arm 15 having a toothed sector 16 and pivot hole 17 is shown, for illustrative purposes, mounted for pivotal movement about an eyelet 18 extending between the pair of support ears 7, 8, and, as an alternative construction, pivoting about a screw 18' extending between the pair of support ears 5, 6. Each toothed sector 16 extends through a slot 19 in housing 9 into meshed engagement with the circumferentially extending grooves 13 of puller shaft 10.

To operate, the base 3 of the cork puller 1 is placed on the rim of a corked bottle neck and the puller shaft 10 is then turned to embed the worm portion thereof in the bottle cork, thereby pulling shaft 10 down and simultaneously causing lever arms 15 to rotate upwardly about pivot 18. Upon thereafter forceably rotating the lever arms 15 downwardly to their original position, the puller shaft 10 is thereby upwardly to raise and remove the cork from the bottle.

Figure 2:
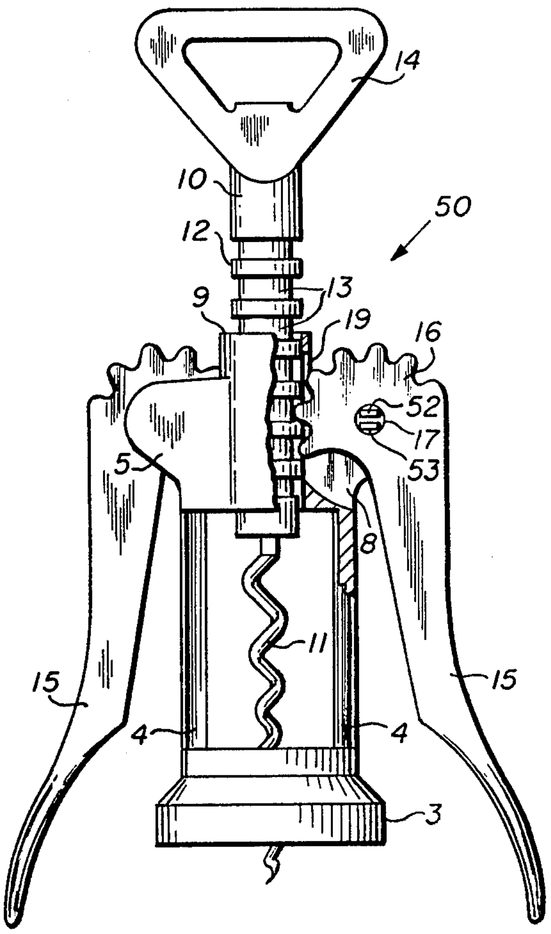
FIG. 2 is a view in elevation, partly sectional, of a mechanical cork puller constructed in accordance with a preferred embodiment of the present invention, illustrating the lever arm mounted for pivotal movement about a pair of parallel rib members formed on the inner surfaces of each pair of opposed support ears and also illustrating the smooth, uninterrupted outer surface of the support ears at the pivot point for the lever arms.
Figure 4:
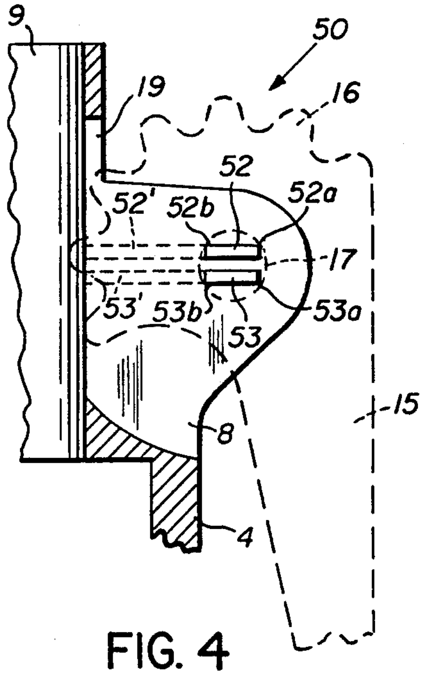
FIG. 4 is an enlarged fragmentary sectional view of the upper portion of the main body and one support ear of the cork puller of FIG. 2 in the second stage of manufacture according to the preferred method of the invention, the view illustrating a pair of parallel rib members formed on the inner surface of the support ear and also illustating the rib members cut away so as to have a length adapted to closely fit within the pivot hole of the rotating lever arm.
Figure 7:
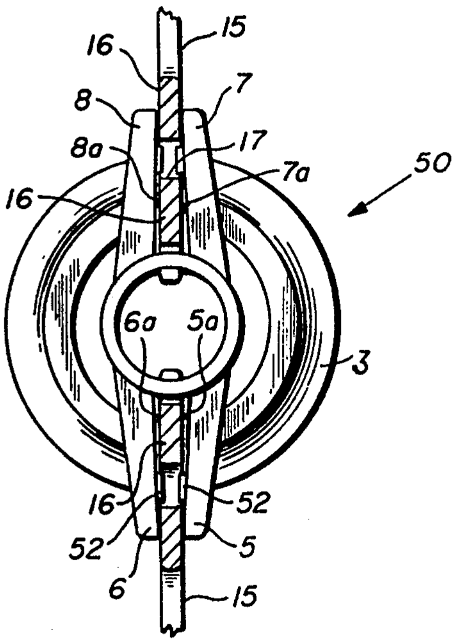
FIG. 7 is a top plan view of the mechanical cork puller shown in FIG. 2 in its final assembled state, the view illustrating the rotating lever arms fixedly mounted for pivotal movement between opposed pairs of support ears with rib members located within the pivot holes formed in the rotating lever arms and the support ears bent toward each other so that the inner surfaces thereof have an inwardly diverging taper, and also illustrating a loose fit between the lever arms and the support ears adjacent the cork puller shaft while a snug fit is obtained therebetween at the outer ends of the support ears.

Referring now more particularly to the preferred embodiment of the article of manufacture of the present invention, best shown in FIGS. 2, 4 and 7 of the accompanying drawings, there is illustrated a mechanical cork puller, indicated generally by reference numeral 50, whose like parts to the previously described known constructions of such devices are designated by like numerals.

In accordance with the invention, cork puller 50 is provided with pivot means for the lever arms 15 which are not visible on the outer surfaces of the support ears 5, 6 and 7, 8, and which provides freedom of movement between the toothed sectors 16 of the lever arms 15 and the circumferentially grooved screw portion 12 of the puller shaft 10.

As here preferably embodied, the pivot means of the invention comprises a pair of parallel spaced rib members 52, 53 formed on the inner surfaces of each of the support ears 5, 6, 7, 8 and adapted to closely fit within the pivot hole 17 of rotating lever arms 15. In addition, as preferably embodied, each pair of support ears 5, 6 and 7, 8, respectively, are formed so as to have an inwardly diverging taper along their spaced inner surfaces **5*a*, 6*a* and 7*a*, 8*a*, respectively, providing a snug fit between the lever arms 15 and the support ears at the outer ends thereof (pivot point) while providing a loose fit where the toothed sectors 16 of the lever arms 15 mesh with the grooves 13 on the cork puller shaft 10**.

Advantageously, rib members 52, 53 are formed integral with the support ears and are only slightly raised from the inner surfaces thereof, preferably a distance of no less than about 1/64 inch. It will, of course, be understood that the minimum height of the ribs 52, 53 must be a distance sufficient to securely hold the lever arms 15 against disengagement during normal usage and that the maximum height is governed by the distance that support ears 5, 6, 7, 8 may be spread apart without undue effort and still return to their original position.

Also advantageously, ribs 52, 53 are approximately equal in length to the width across the spaced ribs, the aforesaid length and width preferably being of a distance such that the ends **52*a*, 52*b*, 53*a*, 53*b* of the ribs 52, 53 form a square whose diagonal length is approximately equal to the diameter of the pivot hole 17 of lever arms 15**.

Figure 8:
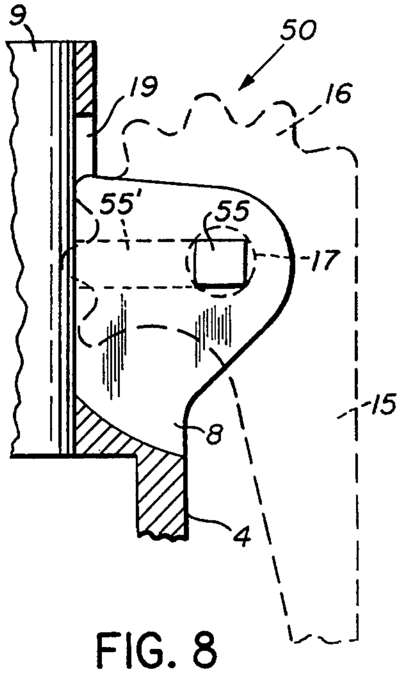
FIG. 8 is an enlarged fragmentary sectional view similar to FIG. 4, illustrating an alternative embodiment of the invention, wherein a single rib member is formed on each of the inner surfaces of the opposed support ears, the dotted lines illustrating the tapered portions formed during the casting operation and subsequently cut away so as to form the rib with a length adapted to closely fit within the pivot hole of the rotating lever arm.

In an alternative embodiment of the article of manufacture of the invention, illustrated in FIG. 8 of the accompanying drawings, the pivot means comprises only a single rib member 55. Here again, however, the length and width of rib 55 preferably are approximately equal and are of such a length that the diagonal thereof is approximately equal to the diameter of pivot hole 17 of lever arms 15.

Referring now more particularly to the method of manufacture of the present invention, in the preferred embodiment thereof illustrated in FIGS. 3–7 the main body portion 2 of cork puller 50 is initially die-cast from a standard die-casting metal, such as, e.g., zinc, with parallel spaced rib members 52, 53 cast in place as an integral part of the main body 2.

Figure 3:
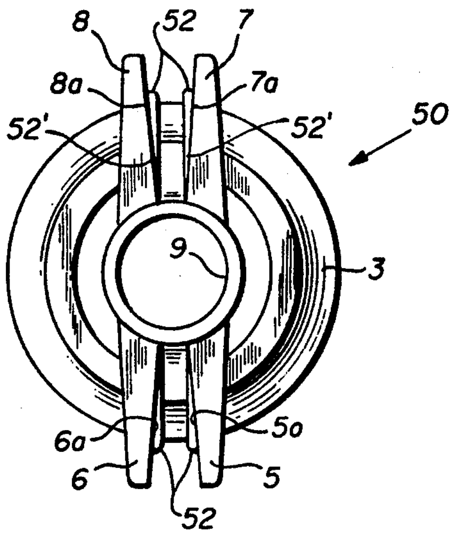
FIG. 3 is a top plan view of the main body portion of the cork puller of FIG. 2 in the first stage of manufacture according to the method of the present invention, the view illustrating the outwardly diverging taper of the inner walls of each pair of opposed support ears and, to a much lesser extent, the inwardly diverging taper of the opposed rib members formed on the inner surfaces of the support ears so as to approximate a parallel juxtaposition therebetween.
Figure 5:
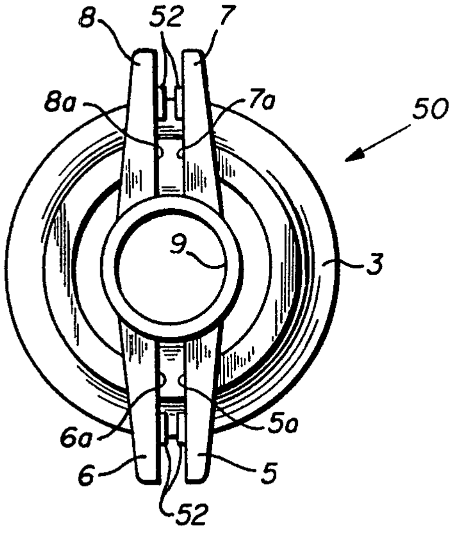
FIG. 5 is a top plan view of the main body portion of the cork puller of FIG. 2 in the third stage of manufacture according to the preferred method of the invention, the view illustrating each opposed pair of support ears having their outer ends bent toward each other into an intermediate position, where the inner surfaces thereof are approximately parallel.

Advantageously, for ease of casting and simplicity of manufacture of the casting mold, ribs 52, 53, "as cast", extend along the entire length of the inner surface 5, 6, 7, 8 of the support ears to the desired outermost point, advantageously increasing in height to the preferred height of approximately 1/64 inch adjacent the outer ends thereof. Also for ease of casting, as best shown in FIG. 3, support ears 5, 6, 7, 8 are cast so that the respective opposed inner surfaces **5*a*, 6*a* and 7*a*, 8*a* thereof have an outwardly diverging taper. The space between inner surfaces 5*a*, 6*a* and 7*a*, 8*a*, respectively, adjacent slots 19 in housing 9 as cast is selected so as to permit the toothed sectors 16 of the lever arms 15** to loosely fit therebetween.

Upon completion of the die-casting operation, as best shown in FIG. 4, the inner ends 52' and 53' of the cast ribs 52, 53 are shaved away by a suitable cutting tool (not shown), such as, e.g., a knife blade mounted to the ram section of a suitable press machine, such as a power press or an arbor press (not shown). After cutting, ribs 52, 53 are of a length as previously described so as to closely fit within pivot hole 17 of lever arm 15.

As previously mentioned, it is preferred that two spaced ribs 52, 53 be cast, and this is primarily for the reason that there is less material present to be later shaved away, thereby easing the cutting operation. Nevertheless, the invention may be satisfactorily achieved with a single rib member 55, as shown in FIG. 8 and previously discussed hereinabove, it being understood that the casting and shaving operations are otherwise identical.

After casting and shaving, the outer ends of each pair of support ears 5, 6, and 7, 8 respectively, are then preferably bent toward each other until the inner surfaces **5*a*, 6*a* and 7*a*, 8*a*, respectively, are approximately parallel. The body 2 may then be suitably plated, if desired, and is then ready to receive the lever arms 15**, which are formed in the usual manner.

Figure 6:
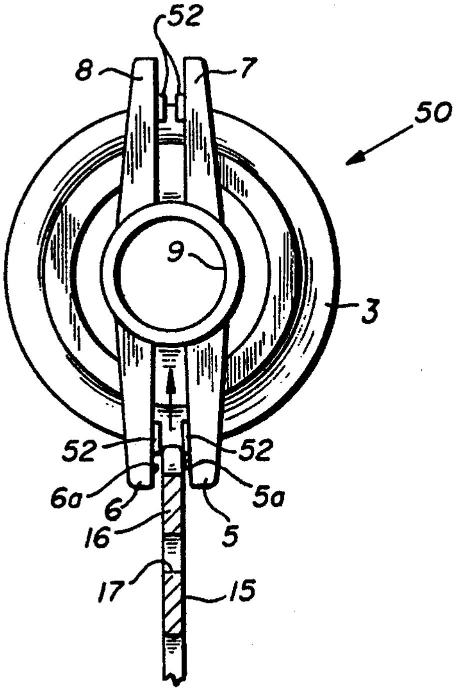
FIG. 6 is a top plan view, partly sectional, of the main body portion of the cork puller of FIG. 2 in the fourth stage of manufacture according to the preferred method of the invention, the view illustrating a rotating lever arm being forceably inserted between a pair of support ears bent to the intermediate position shown in FIG. 5, thereby temporarily spreading apart the support ears so as to permit the lever arm to pass between the rib members and to thereafter "snap" in place when the rib members are encompassed by the pivot hole of the lever arm and the toothed sector thereof is in meshed engagement with the circumferential grooves of the puller shaft.

Installation of lever arms 15 is best seen in FIG. 6, and this step constitutes suitably forceably slidably inserting the toothed sector portions 16 thereof into the spaces between support ears 5, 6 and 7, 8, respectively, thereby causing the ears to spring apart slightly as the portion 16 passes between the ribs 52, 53, until the teeth thereof are brought into meshed engagement with the grooves 13 of the outer shaft 10, at which point pivot hole 17 encompasses the ribs, whereupon the ears snap back to their original position, thereby locking the lever arms 15 in place. At this stage of preferred manufacture, the toothed sectors fit loosely between the support ears, although held securely in place by ribs 52, 53 within pivot hole 17.

Thereafter, in the preferred embodiment of the method of manufacture of the invention, the support ears 5, 6 and 7, 8, respectively, are subjected to a second bending operation so as to further bend the outer ends of the ears toward each other until they fit closely against the sides of the toothed sectors of the lever arms, while retaining a loose fit adjacent the puller shaft 10 and tubular housing 9.

As an alternate embodiment of the method of manufacture of the invention, the outer ends of the support ears 5, 6 and 7, 8, respectively, may be bent toward each other until the inner surfaces 5*a*, 6*a* and 7*a*, 8*a*, respectively, have an inwardly diverging taper in a single operation. Thereafter, in the manner previously described, the lever arms 15 may be suitably forceably slidably inserted between the opposed supporting ears 5, 6, and 7, 8, respectively.

Whether one or two bending steps are used, it has been found that the force required to insert the lever arms between the respective opposed supporting ears is not great and can be easily performed manually and yet, once the support ears have snapped back to their original position, the lever arms are held about the ribs 52, 53 by a very strong retaining force, and cannot thereafter be disengaged by manual force alone.

The invention in its broader aspects is not limited to the specific embodiments herein shown and described but departures may be made therefrom without departing from the principles of the invention and without sacrificing its chief advantages.

I claim:

1. A method for the manufacture of a mechanical cork puller having a cork puller shaft and at least one lever arm mounted for pivotal movement between a pair of opposed support members about a pivot hole formed in said one lever arm, and wherein said lever arm is adapted to linearly displace said cork puller shaft so as to raise and remove a cork from a bottle, said method including the steps of:

- providing pivot means on the opposed inner surfaces of said support members which is not visible on the outer surfaces thereof, said pivot means being provided by the steps of
  - forming a pair of elongated spaced parallel rib members integrally with each of the inner surfaces of said support members, and
  - cutting said rib members to a length which is adapted to be received in said pivot hole provided in said lever arm; and
- temporarily springing apart said support members by forceably slidably inserting said lever arm between said support members and said pivot means until said pivot means is in registry with said pivot hole, whereupon said support members spring back to their original position to thereby lock the lever arm in place for pivotal movement about said pivot means.

2. The method as claimed in claim 1, wherein a single rib member is formed integral with each of the inner surfaces of said support members and is thereafter cut to a length which is adapted to be received in said pivot hole in said lever arm.

3. The method as claimed in claim 1, wherein said support members and said rib members are die-cast from metal.

4. The method as claimed in claim 1, wherein said rib members are cut to a length which is approximately equal to the width across said rib members and the diagonal of the length and width is approximately equal to the diameter of said pivot hole in said lever arm.

5. The method as claimed in claim 1, further including the steps of:

- initially forming said support members so that their inner surfaces have an outwardly diverging taper and said rib members have an approximately parallel juxtaposition, said support members being spaced apart at their inner ends a distance adapted to loosely receive said lever arm therebetween;
- cutting said rib members to the desired length for receipt in said pivot hole of said lever arm while said support members are in the initially formed position;
- bending the outer ends of said support members toward each other until the inner surfaces thereof have an inwardly diverging taper; and
- thereafter forceably slidably inserting said lever arm into place between said support members for pivotal movement about said pivot means, the outer ends of said support members snugly fitting against the sides of said lever arm.

6. The method as claimed in claim 2, wherein the length and width of each of the single rib members is approximately equal and the diagonal of the length and width is approximately equal to the diameter of said pivot hold in said lever arm.

7. The method as claimed in claim 5, further including the steps of:

- initially bending the outer ends of said support members toward each other from said initially formed position to an intermediate position where their inner surfaces are approximately parallel to one another;
- thereafter forceably slidably inserting said lever arm into place between said support members for pivotal movement about said pivot means; and
- thereafter bending the outer ends of said support members toward each other until their inner surfaces have said inwardly diverging taper.

* * * * *